United States Patent
Gallucci

(10) Patent No.: US 9,000,102 B2
(45) Date of Patent: Apr. 7, 2015

(54) PROCESS FOR PREPARING AMINE-MODIFIED POLYESTER RESINS WITH IMPROVED MELT FLOW

(71) Applicant: SABIC Innovative Plastics IP B.V., Bergen Op Zoom (NL)

(72) Inventor: Robert R. Gallucci, Mt. Vernon, IN (US)

(73) Assignee: SABIC Global Technologies B.V., Netherlands (EP)

(*) Notice: Subject to any disclaimer, the term of this patent is extended or adjusted under 35 U.S.C. 154(b) by 0 days.

(21) Appl. No.: 13/828,986

(22) Filed: Mar. 14, 2013

(65) Prior Publication Data
US 2013/0197151 A1    Aug. 1, 2013

Related U.S. Application Data

(62) Division of application No. 13/163,599, filed on Jun. 17, 2011, now abandoned.

(51) Int. Cl.
| | | |
|---|---|---|
| C08G 63/00 | (2006.01) | |
| C08G 63/91 | (2006.01) | |
| B29C 47/00 | (2006.01) | |
| B29C 47/10 | (2006.01) | |
| C08G 63/685 | (2006.01) | |
| B29C 47/38 | (2006.01) | |
| B29C 47/76 | (2006.01) | |
| B29C 47/88 | (2006.01) | |
| B29K 105/16 | (2006.01) | |

(52) U.S. Cl.
CPC .......... C08G 63/916 (2013.01); B29C 47/0011 (2013.01); B29C 47/0066 (2013.01); B29C 47/1045 (2013.01); C08G 63/6856 (2013.01); B29C 47/385 (2013.01); B29C 47/0004 (2013.01); B29C 47/76 (2013.01); B29C 47/8895 (2013.01); B29K 2105/16 (2013.01)

(58) Field of Classification Search
USPC .......... 525/418, 419, 437; 528/272, 288, 492
See application file for complete search history.

(56) References Cited

U.S. PATENT DOCUMENTS

| | | | |
|---|---|---|---|
| 4,193,896 A | 3/1980 | Cook et al. | |
| 4,579,906 A | 4/1986 | Zabrocki et al. | |
| 4,760,100 A | 7/1988 | McDaniel et al. | |
| 4,837,115 A * | 6/1989 | Igarashi et al. | 428/36.92 |
| 4,868,047 A * | 9/1989 | Hasegawa et al. | 428/324 |
| 5,120,822 A | 6/1992 | Hoeschele et al. | |
| 5,521,230 A | 5/1996 | Bhatia et al. | |
| 7,405,249 B2 | 7/2008 | Kim et al. | |
| 7,405,250 B2 | 7/2008 | Kim et al. | |
| 7,825,176 B2 | 11/2010 | Kim et al. | |
| 2007/0060719 A1 | 3/2007 | Clement et al. | |

OTHER PUBLICATIONS

Popoola, V.A.; Journal of Applied Polymer Science, 1988, vol. 36, p. 1677-1683.*
Schiers, J., et al.; Modern Polyesters, 2003, p. 166-167.*
International Search Report for PCT/US2012/051180, mailed Feb. 27, 2013.

\* cited by examiner

*Primary Examiner* — Robert Jones, Jr.
(74) *Attorney, Agent, or Firm* — Honignan Miller Schwartz and Cohn LLP; Reidi M. Berven

(57) ABSTRACT

The invention is directed to a process for preparing a linear or branched amine-modified thermoplastic resin with high flowability using as starting materials a linear or branched polyester and a primary or secondary aliphatic amine. The process does not require that the amine and polyester be combined in a liquid organic solvent during the process, and can be performed readily at ambient pressure. The amine-modified resins can be extruded and pelletized using normal operating conditions, making this process a versatile option for achieving a wide variety of viscosities in a simple, low cost, continuous operation.

17 Claims, No Drawings

PROCESS FOR PREPARING AMINE-MODIFIED POLYESTER RESINS WITH IMPROVED MELT FLOW

CROSS-REFERENCE TO RELATED APPLICATIONS

This application is a divisional application of U.S. patent application Ser. No. 13/163,599, filed Jun. 17, 2011, the entire contents of which is incorporated herein by reference.

BACKGROUND OF THE INVENTION

The invention relates to a process for preparing amine-modified polyester resins with improved melt flow.

Polyesters and copolyesters, as well as their blends with other thermoplastics, are used to make a range of products that includes injection molded parts, films, blow-molded goods, and pultruded sheets. These articles are used in automotive, electrical and electronic applications. The mechanical strength, electrical insulation and easy processability are some of the key characteristics of polyesters which enable their use in these applications. The current industrial trend is toward the fabrication of parts, with complicated and fine designs, with small flow cross-sectional areas where the fluidity of conventional polyesters has been found inadequate.

To address the demanding requirements of high melt flowability, a polyester resin can be replaced by another polyester resin having lower viscosity. Thus there exists a need to prepare a wide variety of high flow polyester resins in a simple, low cost manner that can be applied to both large and small scale continuous production. Further, the process should be environmentally friendly using no solvent. Furthermore, the process should be accomplished without the need for large scale chemical plant construction or capital investment. In other instances there is a need to convert high viscosity polyester compositions into lower viscosity compositions through a simple low cost melt process.

U.S. Pat. Nos. 7,825,176, 7,405,250, and 7,405,249 disclose polyester compositions with high flowability. The compositions comprise a polyester and an alcohol that acts as a flow enhancer. A need remains, however, for processes to make amide functionalized polyester compositions with high flowability that rely on non-alcoholic flow enhancers.

SUMMARY OF THE INVENTION

These and other needs are met by the present invention, which is directed to a process for preparing amine-modified polyester resins by a simple, inexpensive solvent-free process. Specifically, the invention is directed to a solvent-free process for preparing an amine-modified thermoplastic polyester resin by mixing a melted polyester of Formula 1, shown below,

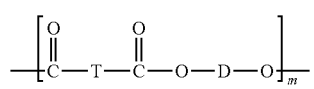

Formula 1 with a melted amine, having the formula $NHR^1R^2$, thereby forming an amine-modified thermoplastic polyester resin characterized by one or both of the following properties:

(i) the resin comprises 0.01 to 5 weight percent of the amine; and (ii) the ratio of the melt flow of the resin compared to the unmodified polyester of Formula, as measured according to ASTM D1238, is at least 1.05:1.

For the polyester of Formula 1, each T is independently a divalent $C_{6-10}$ aromatic group derived from a dicarboxylic acid or a chemical equivalent thereof. Also, each D is independently a divalent $C_{2-8}$ alkylene group derived from a dihydroxy compound or a chemical equivalent thereof. Additionally, m is from 25 to 1000.

For the amine of the present invention, $R^1$ is $C_6$-$C_{36}$ alkyl; $R^2$ is selected from the group consisting of hydrogen, $C_1$-$C_{36}$ alkyl, $C_1$-$C_{36}$ alkylene-aryl, $C_1$-$C_{36}$ alkylene-heteroaryl $C_1$-$C_{36}$ alkylene-cycloalkyl, $C_1$-$C_{36}$ alkylene-heterocycloalkyl; and $NHR^1R^2$ contains at least 10 carbons.

In another aspect, the invention is directed to compositions comprising the resins described herein, as well as to articles prepared by the process of the present invention.

DETAILED DESCRIPTION OF THE INVENTION

All cited patents, patent applications, and other references are incorporated herein by reference in their entirety. However, if a term in the present application contradicts or conflicts with a term in the incorporated reference, the term from the present application takes precedence over the conflicting term from the incorporated reference. All ranges disclosed herein are inclusive of the endpoints, and the endpoints are independently combinable with each other. The use of the terms "a" and "an" and "the" and similar referents in the context of describing the invention (especially in the context of claims) are to be construed to cover both the singular and the plural, unless otherwise indicated herein or clearly contradicted by context. Further, it should further be noted that the terms "first" "second," and the like herein do not denote any order, quantity, or importance, but rather are used to distinguish one element from another. The modifier "about" used in connection with a quantity is inclusive of the stated value and has the meaning dictated by the context (that is, it includes the degree of error associated with measurement of the particular quantity).

Process of the Invention

As provided above, the invention is directed to a process for preparing a linear or branched amine-modified polyester resin using a linear or branched polyester and to amine, $NHR^1R^2$, as starting materials. In the process of the present invention, melted polyester is mixed with melted amine to form an amine-modified polyester resin. The polyester can be melted, by heating to a temperature at or above its melting point, before mixing with the amine, concurrent with mixing with the amine, after initially mixing with the amine, or a combination thereof.

The term "melted amine" means an amine that is in its liquid state at room temperature or which requires heating to melt. In the present invention, the amine can be melted before mixing with the polyester, concurrent with mixing with the polyester, after initially mixing with the polyester, or a combination thereof.

However, to form the amine-modified polyester, of the present invention, mixing of melted polyester and melted amine must occur.

"Solvent-free" as used herein means free of a liquid that solubilizes the polyester, the amine, or both polyester and amine, prior to, during, or subsequent to the process of mixing the components to form the amine-modified resin. Solvent-free means that organic or aqueous solvents, if present at all, are present only in trace or residual quantities. If an organic liquid solvent is present in the mixture, it is typically a residual solvent, such as chlorobenzene, dichlorobenzene, toluene, cresol, phenol, chloroethylenes or the like, that was used in an earlier processing or manufacturing steps, and is at a concentration of 1000 ppm or less and more preferably of 500 ppm or less. Typically, such residual solvents have a molecular weight of less than 200 and a boiling point at ambient pressure of 200° C. or lower. "Ambient pressure" means the atmospheric pressure where the resin is being manufactured, which is typically measured as barometric pressure.

In addition, both the mixing and melting steps of the resin process are readily performed at ambient pressure with no vacuum applied to prevent the amine from volatilizing before reacting.

The materials used in the process of the present invention include polyesters, a primary or a secondary aliphatic amine or mixture thereof, and optional additives.

In one embodiment, the polyester is a linear polyester having repeating structural units of Formula 1:

Formula 1

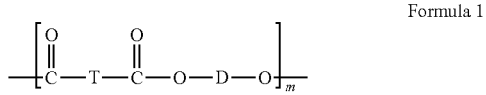

wherein, for a single repeating unit, the value of m is 1. Further, the amine is $NHR^1R^2$, wherein at least one of $R^1$ and $R^2$ is $C_{10-36}$ alkyl and the other of $R^1$ and $R^2$ is selected from the group consisting of hydrogen, $C_1$-$C_{36}$ alkyl, $C_1$-$C_{36}$ alkylene-aryl, $C_1$-$C_{36}$ alkylene-heteroaryl, $C_1$-$C_{36}$ alkylene-cycloalkyl, $C_1$-$C_{36}$ alkylene-heterocycloalkyl; and the resulting resin is a linear resin of Formula 2:

Formula 2

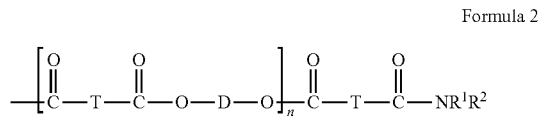

wherein:
each T is independently a divalent $C_{6-10}$ aromatic group derived from a dicarboxylic acid or a chemical equivalent thereof;
each D is independently a divalent $C_{2-8}$ alkylene group derived from a dihydroxy compound or a chemical equivalent thereof;
$R^1$ is $C_{6-36}$ alkyl and $R^2$ is selected from the group consisting of hydrogen, $C_1$-$C_{36}$ alkyl, $C_1$-$C_{36}$ alkylene-aryl, $C_1$-$C_{36}$ alkylene-heteroaryl, $C_1$-$C_{36}$ alkylene-cycloalkyl, and $C_1$-$C_{36}$ alkylene-heterocycloalkyl;
m and n vary from 25 to 1000; and
n is less than m.

In other embodiments, the ingredients of the composition of the present invention may additionally optionally comprise fillers, reinforcement, colorants additives, or combinations thereof.

The composition ingredients of these and other embodiments are described in greater detail in the following paragraphs.
Polyester The polyesters used in the process and composition disclosed herein are linear or branched thermoplastic polyesters having repeating structural units of Formula 1.

In one embodiment, each T group is the same and each D group is the same.

Alternately, copolyesters containing a combination of different T and/or D groups can also be used.

Chemical equivalents of diacids include the corresponding esters, alkyl esters, e.g., $C_{1-3}$ dialkyl esters, diaryl esters, anhydrides, salts, acid chlorides, acid bromides, and the like.

Chemical equivalents of dihydroxy compounds include the corresponding esters, such as $C_{1-3}$ dialkyl esters, diaryl esters, and the like. The polyesters can be branched or linear.

Examples of $C_{6-14}$ aromatic dicarboxylic acids that can be used to prepare the polyesters include isophthalic acid, terephthalic acid, 1,2-di(p-carboxyphenyl)ethane, 4,4'-dicarboxydiphenyl ether, 4,4'-bisbenzoic acid, and the like, and 1,4- or 1,5-naphthalene dicarboxylic acids and the like. A combination of isophthalic acid and terephthalic acid can be used, wherein the weight ratio of isophthalic acid to terephthalic acid is 91:9 to 2:98, specifically 25:75 to 2:98. In some instances 50 percent or more of the ester linkages in Formula 1 are terephthalate ester linkages.

Exemplary diols useful in the preparation of the polyesters include $C_{2-4}$ aliphatic diols such as ethylene glycol, 1,2-propylene glycol, 1,3-propylene glycol, 1,4-butane diol, 1,2-butylene diol, 1,4-but-2-ene diol, diethylene glycol, cyclohexane dimethanol, and the like. In one embodiment, the diol is ethylene and/or 1,4-butylene diol. In another embodiment, the diol is 1,4-butylene diol. In still another embodiment, the diol is ethylene glycol with small amounts (0.5 to 5.0 percent) of diethylene glycol.

In some embodiments, each T in the resin of Formula 1 is independently phenyl or naphthyl, and each D in the resin of Formula 1 is independently selected from the group consisting of ethylene, propylene, butylene, and dimethylene cyclohexene.

Specific exemplary polyesters include poly(ethylene terephthalate) (PET), poly(1,4-butylene terephthalate) (PBT), poly(ethylene naphthalate) (PEN), poly(butylene naphthalate) (PBN), and poly(1,3-propylene terephthalate) (PPT), poly(cyclohexylenedimethylene terephthalate) (PCT) or blends thereof. In one embodiment, the polyester is PET, PBT or a mixture thereof.

In some embodiments, the polyester of Formula 1 is a post-consumer (recycled) polyester, such as recycled PET or similar recycled resins. Such recycled resins are commercially available from a variety of sources such as bottles, films, and fibers. In one instance post consumer PET bottles with a diethylene glycol (DEG) content of 0.5 to 2.5 mole percent and 10 to 500 ppm of a metal selected from the group consisting of Ti, Sb, Sn, Zn, Ge, Zr, Co or mixtures thereof are preferred.

In still another specific embodiment, the polyester is PBT with a weight average molecular weight (Mw) of 10,000 to 50,000. It is to be understood that such terephthalate-based polyesters can include amounts of aliphatic diacids or isophthalate esters as well. Mixtures of polyesters of different type and/or different molecular weights can also be employed. In some embodiments, 50 percent or more of the ester linkages in formula A are terephthalate ester linkages.

Typically, the polyester will further contain 10 to 500 ppm of a metal catalyst residue wherein the metal is selected from the group consisting of at least one: Ti, Sb, Sn, Zn, Ge, Zr, and Co. The polyester may further comprise 10 to 200 ppm of a phosphorous containing compound such as acidic phosphorus species used as a catalyst quencher.

The polyesters of formula 1 can have any end group configuration. In most instances the end groups will be hydroxy, carboxylic acid or ester end groups. In some instances, the polyester will have a carboxylic acid (COOH) end group content of from 15 to 40 meq/Kg.

Amine

The amine used in the process and composition disclosed and claimed herein is a primary or secondary aliphatic amine or any mixture thereof, thermally stable at polyester melt processing temperatures, above about 200° C. and more specifically above about 250° C. The amine of the process and composition disclosed herein typically has a boiling point that is 200° C. or higher at ambient pressure and a carbon to nitrogen ratio of 10:1 to 36:1, and thus a total number of carbons in $R^1$ and $R^2$ combined is from 10 to 36 carbons.

Exemplary amines are primary alkyl amine such as stearyl amine, decyl amine, dodecyl amine, tetradecyl amine, 3-methyl-1-octyl amine, 3-ethyl-hexyl amine, 4-phenyl butyl amine, 2,7-diphenyl heptyl amine, 1 methyl-3-phenyl amine and the like. In some instances the primary amine will be a $C_{10}$-$C_{20}$ alkyl amine.

The primary or secondary aliphatic amine can be combined in the melt with polymer resins at from 0.01 to 5 weight percent of the mixture. Preferably, the composition will employ the amine in an amount of from 0.05 to about 2.5 weight percent and more preferably, in an amount of from 0.1 to about 1.0 weight percent of the amine. In some instances the amine will be a low color amine, for instance with a yellowness index of less than 10.

Filler

A filler or reinforcement agent may also be added to the amine modified polyester resin disclosed herein. In some embodiments, the filler is selected from the group consisting of fiber glass, carbon fibers, ceramic fibers, talc, clay, mica, wollastonite, silica, quart, alumina, barium sulfate, carbon, graphite, metal oxides, glass beads, glass flakes, milled glass and any combination thereof. Fillers can also be nano fillers such as nano clay and carbon nanotubes. Effective amounts of the filler vary widely, but they are usually present in an amount of less than or equal to 1 to 60 weight percent, based on the total weight of the composition.

In some embodiments, the filler is glass fiber. In one embodiment, the glass fibers that are used are relatively soda free. Fibrous glass filaments comprised of borosilicate glass, also known as "E" glass, are often preferred. Glass fiber is added to the composition to increase the flexural modulus and strength. The glass filaments can be made by standard processes, e.g., by steam or air blowing, flame blowing and mechanical pulling. The preferred filaments for plastic reinforcement are made by mechanical pulling in various diameters. The fibers can also be bundled and chopped for easier handling. The fibers can be further treated with coupling agents and sizing. Exemplary coupling agents are amine or epoxy functional alkoxy silanes. In some embodiments the glass fiber of a 9 to 20 micron diameter is present at 10 to 40 weight percent.

The glass fibers may be blended first with the other ingredients and then fed to an extruder and the extrudate cut into pellets, or, in a preferred embodiment, they may be separately fed to the feed hopper of an extender. The glass fibers may be fed downstream in the extruder to minimize attrition of the glass. The pellets so prepared when carting the extrudate may be one-fourth inch long or less. Such pellets contain finely divided uniformly dispersed glass fibers in the composition. The dispersed glass fibers are reduced in length as a result of the shearing action on the chopped glass strands in the extruder barrel. This process can also be used to make long glass reinforced modified compositions wherein the glass fiber in essentially continuous in the pellet, sometimes as long as 0.5 to 1.0 inches.

The amine compounds can be feed into the melt processing equipment, for instance an extruder, along with the additive, for instance glass fiber, to form the modified polyester composition while mixing in the additive. In other instances the additive or fiber can be pre-compounded into the polyester and then melt processed with the amine compound to prepare the improved flow composition.

Additives

The resin disclosed herein can also include various other additives ordinarily incorporated with compositions of this type, with the proviso that the additives are selected so as not to significantly adversely affect the desired properties of the composition. Combinations of additives can be used. Exemplary additives include antioxidants, dyes, pigments, colorants, heat stabilizers, flame retardants, drip retardants, crystallization, nucleators, metal salts, antistatic agents, plasticizers, lubricants, UV stabilizers, and combinations comprising two or more of the foregoing additives. These additives are known in the art as are their effective levels and methods of incorporation. Effective amounts of the additives vary widely, but they are usually present in an amount of less than or equal to 10 weight percent, based on the total weight of the composition. Amounts of these additives are generally 0.25 weight percent to 2 weight percent, based upon the total weight of the composition.

Exemplary antioxidant and heat stabilizer additives include, for example, organophosphites such as tris(nonyl phenyl)phosphite, tris(2,4-di-t-butylphenyl)phosphite, bis(2, 4-di-t-butylphenyl)pentaerythritol diphosphate, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate pentaerythrityl-tetrakis[3-(3,5-di-tert-butyl-4-hydroxyphenyl)
propionate or the like; amides of beta-(3,5-di-tert-butyl-4-hydroxyphenyl)-propionic acid or the like, or combinations comprising at least one of the foregoing antioxidants. Antioxidants can be used in amounts of 0.001 to 1 weight percent, based on the total weight of the composition.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers.

Exemplary lubricants and mold release agents include alkyl esters for example, pentaerythritol tetrastearate (PETS), alkyl carboxylic acid salts, alkyl amides, such as ethylene bis-stearamide, and polyolefins, such as polyethylene.

Exemplary flame-retardant additives are present in an amount at least sufficient to reduce the flammability of the polyester resin, preferably to a UL94 V-0 rating. The amount will vary with the nature of the resin and with the efficiency of the additive. In general, however, the amount of additive will be from 2 to 30 percent by weight. A preferred range will be from about 10 to 20 percent by weight. Typical flame-retardants include halogenated flame retardants such as polybromophenyl ether, brominated polystyrene, brominated BPA polyepoxide, brominated imides, or mixtures thereof. It is strongly preferred that the flame retardant additive not chemically react with the amine additive of the invention.

Examples of other suitable flame retardants are brominated polystyrenes such as polydibromosytrene and polytribromostyrene, decabromobiphenyl ethane, tetrabromobiphenyl, brominated alpha, omega-alkylene-bis-phthalimides, e.g. N,N'-ethylene-bis-tetrabromophthalimide, or brominated epoxy resins.

The halogenated flame retardants are typically used with a synergist, particularly inorganic antimony compounds. Such compounds are widely available or can be made in known ways. Typical, inorganic synergist compounds include $Sb_2O_5$, $Sb_2S_3$, sodium antimonate and the like. Especially preferred is antimony trioxide ($Sb_2O_3$). Synergists, such as antimony oxides, are typically used at about 0.5 to 15 by weight based on the weight percent of resin in the final composition.

In place of halogenated flame retardants, the use of phosphorous based flame retardants can also be envisaged. Typical phosphorous based flame retardants include organophosphates, for example triaryl phosphates, metal salts of hypophosphorous acid, metal salts of organophosphinic acid and the like. Synergists to these phosphorous based flame retardants, such as melamine cyanurates, melamine pyrophosphates and like can also be included in the composition.

Exemplary drip retardants include fluoropolymers. The fluoropolymer may be a fibril forming or non-fibril forming fluoropolymer. Preferably the fluoropolymer is a fibril forming polymer. In some embodiments polytetrafluoroethylene is the preferred fluoropolymer. In some embodiments it is preferred to employ an encapsulated fluoropolymer i.e. a fluoropolymer encapsulated in a polymer as the anti-drip agent. An encapsulated fluoropolymer can be made by polymerizing the polymer in the presence of the fluoropolymer. Alternatively, the fluoropolymer can be pre-blended in some manner with a second polymer, such as for example, an aromatic polycarbonate resin or a styrene-acrylonitrile resin as in, for example, U.S. Pat. Nos. 5,521,230 and 4,579,906, to form an agglomerated material for use as an anti-drip agent. Either method can be used to produce an encapsulated fluoropolymer.

The anti-drip agent, when present, comprises greater than or equal to about 0.5 weight percent, preferably greater than or equal to about 0.1 weight percent, based on the total weight of the composition. The anti-drip agent, when present, comprises less than or equal to about 5 weight percent, preferably less than or equal to about 2.5 weight percent, and more preferably less than or equal to about 1 weight percent, based on the total weight of the composition.

The amine modified resins prepared by the melt reaction of the amine thermoplastic polyesters may be further melt compounded with other polymers such as non-amine modified polyesters, polystyrene, styrene acrylonitrile (SAN), polycarbonate, polyetherimides, polyolefins and mixtures thereof. Rubber modifiers, alone or in combination with the aforementioned resins, may also be used. Exemplary rubber modifiers are methacrylate butadiene styrene (MBS), butadiene grafted with SAN, styrene butadiene block copolymers (SBS) hydrogenated styrene butadiene block copolymers (SEBS) as well as acrylic rubber, and acrylate styrene acrylonitrile (ASA) rubber.

Process Conditions and Resin Properties

While being held to no specific mechanism or mode of action, it is thought that the reaction that gives rise to the resins described herein is depicted in Scheme 1, wherein polybutylene terephthalate (PBT) is the polyester (although other polyesters can be employed).

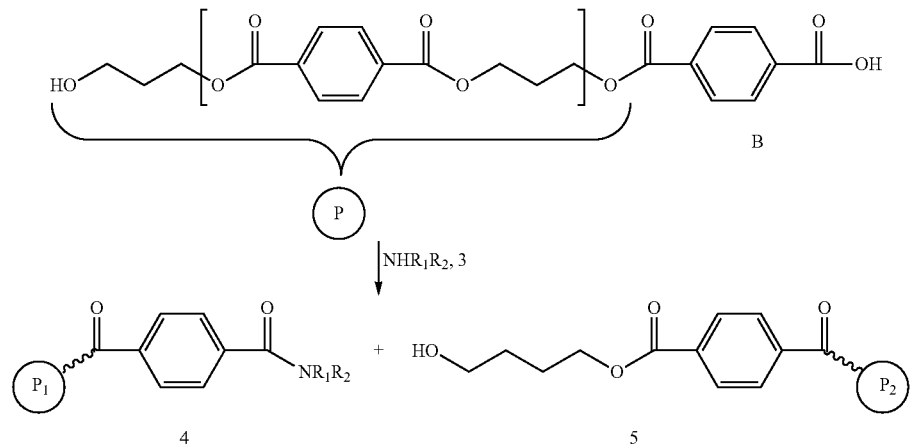

Scheme 1

As shown in Scheme 1, PBT B, where "P" represents a linear or branched polymer, is susceptible to amine attack at each ester linkage of the polymer chain. Condensation of polyester B with the amine 3 under suitable conditions gives rise to the resin 4, which is characterized by a chemically bound amide end group attached to a fragment of the original polyester polymer P, designated as $P_1$, as well as to the lower molecular weight polyester 5 designated as polymer $P_2$. Both $P_1$ and $P_2$ (4 and 5) are lower molecular weight than the initial polyester P. The condensation reaction of the amine 3 with any of polyesters B, 4, or 5 will continue until the amine has been substantially consumed. It is surprising that this high temperature reaction of a few melting or liquid amine, which will be a very low viscosity liquid, is capable of mixing with the relatively high viscosity polyester melt. Further it is very surprising that the reaction is quick enough to be substantially accomplished in the very short contact time (0.5 to 3 minutes) in a normal melt extrusion process. Under most conditions, especially the short contact time in an extruder, the initially termed amide will not react further.

In the process of the present invention, the polyester is at least partially melted; that is, the polyester is at least 80 percent melted. More preferably, the polyester is at least 90 percent melted. More preferably, the polyester is at least 99 percent melted, and most preferably, the polyester is completely melted.

As indicated, the polyester, amine, and other optional components are mixed together. The process of mixing can be achieved using a mixer such as a HENSCHEL-Mixer® high speed mixer or the like. Other low shear processes such as a drum tumbler, paint shaker, vee-blender or hand mixing can also accomplish this mixing. Optionally some of the ingredients can be pre-extruded with the polyester prior to amine addition.

In one embodiment the polyester, amine, and optional additives are mixed and melted using an extruder or other melt mixing apparatus. In one instance the mixture is fed into the throat of an extruder via a hopper or loss in weight feeder. Alternatively, one or more of the components can be incorporated into the composition by feeding directly into the extruder at the throat and or downstream through a side feeder. Alternatively, any desired additives can also be compounded into a masterbatch and then combined with the remaining polymeric components at any point in the process. The extruder is generally operated at a temperature higher than that necessary to cause the composition to flow. Usually this is 20 to 50° C. above the polyester crystalline melting point (Tm) The extrudate is quenched in a water batch and pelletized. Such pellets can be used for subsequent molding, shaping, or forming.

The extruder may be a twin screw extruder such as a Werner Pfleiderer twin screw extruder set at approximately 300 rpm using a 2 or 4-hole die. The barrel temperature is typically set in the range of 200 to 350° C., and more typically in the range of 230 to 270° C. The co-rotating twin screw extruder is run at ambient pressure without vacuum applied to the vent. The absence of applied vacuum aids in the retention of the amine in the molten polymer of formula A allowing for a better opportunity to chemically react to form a grafted amide functionality (3). In one instance the extrude may then be cooled in a water bath, blown dry with air and chopped into pellets approximately ⅛ inch long. The continuous melt reaction may also be accomplished in single screw extruders under similar conditions.

In other instances the amine modification of the polyester resin may be accomplished in an injection molding machine to tailor melt viscosity of the polyesters or polyester blends to the requirements of a specific part or mold. In yet other instances the amine modification may be accomplished in an extruder to make sheet, film or fibers.

The resulting resin of Formula 1 typically has a number average molecular weight of 10,000 to 30,000 and is characterized by a carboxylic acid (COOH) end group content of 10 meq/Kg or less. The resin is essentially free of metal cations or metal oxides selected from the group consisting of Pb, Hg, As, and Cd and thus contains 50 ppm or less and more preferably 10 ppm or less of contaminants. In other instances these harmful metals are not detectable.

Another surprising benefits of some of the high flow resins made by the amine reaction is an improvement in the temperature at which they begin to form crystals when cooled from the melt (Tc=temperature of crystallization). The amine modified resins of Formula 2 have a Tc hat is higher than the Tc of the polyesters of Formula 1. In some instances the Tc of the modified resin is 1 to 10° C. greater than the Tc of the unmodified resin of Formula 1. A higher crystallization temperature is a benefit as it allows faster solidification of the molten polymer often leading to faster cycle time when molding parts, especially in an injection molding processes. The resins of formula 2 typically also have a higher heat of crystal ligation (dHc) as compared to the polyesters of Formula 1. This may indicate a higher crystalline content which may improve stiffness and barrier properties of formed the polyester article.

The resin of Formula 2 typically has an increased melt flow according to ASTM D1238 that is at least 10 percent or higher compared to that of the polyester of Formula 1. In other instances melt flow will be improved by 50 percent over the starting resin. In other instances the amine modified polyester will have a melt flow at 250° C. of from 20 to 100 cc/10 min.

In other instances in addition to high melt flow the amine modified polyester resins also have good stability in the melt (melt dwell) showing less than a 20% change in the initial melt viscosity after being held at 250° C. for 30 minutes at constant shear. In yet other instances the amine modified resin will show a change in melt viscosity (melt dwell) after 30 minutes of less than 15 percent of the initial value. With more than 0.5 wt % added amine the modified polyester shows a change in initial melt dwell viscosity of less than 10% of the initial value. This melt dwell stability is very significant in that it shows that after the initial reaction of amine with the polyester of formula 1 the reaction to form the higher flow polyester of formula 2 is complete. The small change in the melt dwell of the amine modified polyesters of formula 2 shows that there is no further reaction or degradation of the modified polyester. With higher amine content the resin show that in addition to higher flow (a higher melt flow) there is also better melt stability (less change in melt dwell) than the starting polyester of formula 1.

Articles

The polyester composition of the invention may be formed by techniques known in the art. The ingredients are typically in powder or granular form, and extruded as a blend, and/or comminuted into pellets or other suitable shapes. The ingredients may be combined in any manner, e.g., by dry mixing or by mixing in the melted state in an extruder, or in other mixers. For example, one embodiment comprises melt mixing the ingredients in powder or granular form, extruding the mixture and comminuting into pellets or other suitable shapes. Also included is dry mixing the ingredients, followed by mixing in the melted state in an extruder.

The blends of the invention may be formed into shaped articles by a variety of common processes for shaping molten polymers such as injection molding, compression molding, film or fiber extrusion and gas assist injection molding. Examples of such articles include electrical connectors, enclosures for electrical equipment, automotive engine parts, lighting sockets and reflectors, electric motor parts, power distribution equipment, communication equipment, wire coatings and the like including devices that have molded in snap fit connectors. The modified polyester resins can also be made into fibers, films, and sheets.

The following examples illustrate, but do not limit the invention. Any references cited herein are incorporated by reference in their entirety.

EXAMPLES

The materials used to prepare the amine-modified polyester resins are summarized in Table 1.

TABLE 1

| | Materials |
|---|---|
| PBT 315 | Poly(1,4-butylene terphthalate), intinsic viscosity (IV) = 1.10 dl/g, Valox 315 from SABIC Innovative Plastics, 38 meq/Kg COOH |
| PBT 195 | Poly(1,4-butylene terphthalate), intinsic viscosity (IV) = 66 dl/g, Valox 195 from SABIC Innovative Plastics, 17 meq/Kg COOH |
| PET | Poly(1,4-butylene terphthalate), intinsic viscosity 0.535 dl/g IV, 08% diethylene glycol (DEG), 20 meq/kg COOH |
| Glass Fiber | Owens Corning 183F, 13 micron diameter E glass |
| $C_{18}H_{37}NH_2$ | Octadecyl amine (also called stearyl amine) was AREEM 18D from Akzo Nobel, a distilled grade, approximately 98.5% primary amine, Mw = 269.5, amine number approximately 208 mg KOH/g. |

The blends were prepared by the extrusion of mixtures of polybutylene terephthalate (PBT) or polyethylene terephthalate (PET) with octadecyl amine and, in some instances, glass fiber (GF) as shown in Tables 2 to 5. The ingredients were combined and mixed for approximately 4 minutes using a paint shaker. The blends of Tables 2 to 5 were compounded on a 30 mm Werner Pfleiderer twin screw extruder at approximately 450 to 520° F. (approximately 232 to 271° C.) barrel set temperature at approximately 300 rpm using a 2 or 4-hole die. The blends were not dried prior to extrusion. The co-rotating twin screw extruder was run without vacuum applied to the vent. The melt was easy to strand and pelletize, and there was no foaming, vent flow or surging. The extrudate was cooled in a water bath, blown dry with air and then chapped into pellets approximately ⅛ inch long.

The fiber glass filled blends of Table 3 were mixed in a similar fashion adding the fiber glass after an initial mixing period of 4 minutes and gently mixing on a drum tumbler to prevent firming of the glass fiber bundles. The blends were not dried prior to extrusion. The mixtures were extruded on a 2.5 inch Prodex single screw extruder at 450 to 530° F. (approximately 232 to 277° C.) at 80 rpm using a double wave screw. The extruder had a 6 hole die. No vacuum was applied to the vent. The melt was easy to strand and pelletize, and there was no foaming, vent flow or surging. The extrudate was cooled in a water bath, blown dry with air and then chopped into approximately ⅛ inch long pellets. The blends were not dried prior to extrusion.

The pelletized extrudates were dried for at least 4 hours (h) at 120° C. and test parts were injection molded at a set temperature of 240 to 260° C. and mold temperature of approximately 100° C. using a 30 second cycle time.

Test Methods

Melt flow was run using a 1.26 or 2.16 Kg weight at 250 or 265° C. The pellets had been dried for approximately 2 to 4 hours at 120° C. The melt flow was measured after a 6 minute melt equilibration period and is reported as cable centimeters (cc)/10 minutes according to ASTM D1238.

Weight average (Mw) and number average molecular weight (Mn) were measured by gel permeation chromatography (GPC) in a similar fashion according to ASTM D5296. GPC samples were prepared by dissolving approximately 40 mg of sample in 1 mL hexafluoro-2-propanol (HFIP) and 1 mL chloroform. After complete dissolution, the polymer solution was diluted to 5% HFIP using chloroform. The GPC was run using 5% HFIP in chloroform as the eluent with a 295 nm UV detector. Polystyrene (PS) standards were used for calibration.

Differential scanning calorimetry (DSC) was performed according to ASTM D3418 with a 20° C. per minute heating rate to 250° C. for the PBT examples and 290° C. for the PET examples and then cooled at –20° C. per minute. Temperature of crystallization (Tc) and heat of crystallization (dHc) was measured on first cool. The heat of crystallization (dHc), which is the energy released as crystals form from the molten polyester, is reported as Joules/gram (J/g). Temperature of melting (Tm) was measured on second heat and is the peak melting point.

Melt dwell (time sweep) studies were performed according to ASTM D4440 at 250° C. for 30 minutes under nitrogen on a rheometer with a sandwich, or parallel-late/cone-plate, fixture. Viscosity data (poise=P) was compared after 6 minutes (initial value) and 30 minutes (final value). The pellets were dried for approximately 2 to 4 hours at 120° C. prior to testing.

Flexural properties were measured on 3.2 mm injection molded bars according to ASTM method D790 with a 1.27 mm/min cross-bead speed. The molded samples were conditioned for at least 48 hours at 50 percent relative humidity prior to testing.

In the data tables provided below, letters designate comparative examples while numbers designate examples of the invention.

Data

The results for the high molecular weight PBT examples are summarized in Table 2. From 0.1 to 1.0 weight percent of octadecyl amine was extruded with a high molecular weight PBT (315) in a twin screw extruder at 300 rpm set at 450 to 510° F. (approximately 232 to 266° C.) with no vacuum. The melt flow values at 250° C. show that the addition of the amine vastly improves melt flow, giving a much higher melt flow compared to Control A, which contains no added amine. The flow improvement is especially dramatic with 0.5 to 1.0 percent octadecyl amine, where the melt flow increased from 26.3 to 111, representing approximately a two-fold to five fold increase in melt flow compared to Control A. Surprisingly, the octadecyl amine modified polyesters of Table 2 showed good melt stability as measured by the change in viscosity (measured in poise=P) between 6 and 30 minutes at 250° C. (melt dwell). With higher amine levels, the percent change in viscosity decreased from 16.5 to 0.6 percent, indicative of Improved melt stability with higher amine modification.

TABLE 2

High MW PBT Examples

| Example | A [Control] | 1 | 2 | 3 | 4 | 5 |
|---|---|---|---|---|---|---|
| Weight Percent PBT 315 | 100.0% | 99.9% | 99.7% | 99.5% | 99.3% | 99.0% |
| Weight Percent $C_{18}H_{37}NH_2$ | 0.0% | 0.1% | 0.3% | 0.5% | 0.7% | 1.0% |
| Melt Flow 250° C., 2.16 Kg, cc/10 min. | 14.4 | 16.2 | 26.3 | 40.2 | 58.2 | 111.0 |

TABLE 2-continued

High MW PBT Examples

| Example | A [Control] | 1 | 2 | 3 | 4 | 5 |
|---|---|---|---|---|---|---|
| Mw (PS stds) | 95801 | 95404 | 86958 | 82335 | 73618 | 67138 |
| Mn | 28042 | 28076 | 26467 | 25859 | 23974 | 22281 |
| Melt dwell 250° C. 6 min. (P) | 6905 | 6114 | 3678 | 2428 | 1701 | 972 |
| Melt dwell 250° C. 30 min (P) | 5930 | 5104 | 3101 | 2166 | 1613 | 966 |
| Percent change 6 to 30 min. | −14.1% | −16.5% | −15.7% | −10.8% | −5.2% | −0.6% |
| T melting (Tm) ° C. | 223.5 | 223.1 | 222.9 | 224.4 | 224.0 | 224.7 |
| T crystallization (Tc) ° C. | 191.2 | 191.5 | 192.5 | 193.5 | 193.8 | 193.9 |
| Heat of cryst. (dHc) J/g | 54.5 | 52.9 | 56.8 | 56.7 | 56.0 | 55.3 |

The high melt flow and favorable melt stability of the Examples in Table 2 are an advantage for end-uses involving filling thin-walled molded parts with high flow lengths. Examples 1 to 5 also showed enhanced crystallization with increasing amine content as indicated by a higher crystallization temperature (Tc) and a higher heat of crystallization (dHc).

The results for the low molecular weight PBT examples are summarized in Table 3. In these runs, from 0.1 to 0.7 weight percent of octadecyl amine was extruded with a low molecular weight PBT 195 in a twin screw extruder at 300 rpm set at 450 to 510° F. (approximately 230 to 265° C.) with no vacuum. As shown by the melt flow values at 250° C., the addition of the amine vastly improved melt flow, giving a much higher melt flow compared to Example B which contains no added amine. Even when a lower weight was used for the melt flow (1.26 versus 2.16 Kg), the modified polyesters of Examples 6 to 9 still have exception flow. The flow improvement is especially dramatic with 0.3 to 0.7 weight percent octadecyl amine, where 0.7 weight percent of octadecyl amine represents a three-fold increase in melt flow as compared to Control B. Also of note is the higher crystallization temperature (Tc) and the increased crystallinity as shown by a higher heat of crystallization (dHc) as compared to Example B.

TABLE 3

Low Mw PBT Examples

| Example | B [Control] | 6 | 7 | 8 | 9 |
|---|---|---|---|---|---|
| Weight Percent PBT 195 | 100.0% | 99.9% | 99.7% | 99.5% | 99.3% |
| Weight Percent $C_{18}H_{37}NH_2$ | 0.0% | 0.1% | 0.3% | 0.5% | 0.7% |
| Melt Flow 250° C., 2.16 Kg, cc/10 min. | 60.2 | 68.7 | 96.0 | 123.0 | 166.0 |
| Mw (PS std) | 55060 | 54302 | 53150 | 52378 | 51377 |
| Mn | 20777 | 20506 | 20291 | 19922 | 19733 |
| T melting (Tm) ° C. | 223.6 | 224.2 | 223.8 | 223.8 | 223.8 |
| T crystallization (Tc) ° C. | 195.4 | 197.6 | 198.8 | 197.6 | 196.9 |
| Heat of cryst. (dHc) J/g | 57.7 | 57.9 | 58.4 | 60.8 | 62.0 |

Despite their relatively low molecular weights, the amine-modified resins of Table 3 can still be extruded and pelletized using normal operating conditions, making this a very versatile process to achieve a wide variety of viscosities in a simple, low cost, continuous, unit operation.

The results for the PET examples are summarized in Table 4. With only 0.3 to 1.0 weight percent octadecyl amine (Examples 10 to 13), PET melt flow at 265° C. was significantly increased over control (Control C). In particular, Example 13 represents a greater than four-fold increase in melt flow as compared to Control C. The temperature of crystallization (Tc) was increased to 205 to 208° C., and the heat of crystallization (dHc) was increased from 44.5 J/g to as much as 53.9 J/g.

TABLE 4

PET Examples

| Examples | C [Control] | 10 | 11 | 12 | 13 |
|---|---|---|---|---|---|
| Weight Percent PET | 100.0% | 99.9% | 99.7% | 99.5% | 99.3% |
| Weight Percent $C_{18}H_{37}NH_2$ | 0.0 | 0.3% | 0.5% | 0.7% | 1.0% |
| Melt Flow 265° C., 1.2 Kg, cc/10 min. | 50.8 | 94.3 | 101.2 | 137.5 | 210.0 |
| Mw | 45577 | 40536 | 38284 | 36884 | 33834 |
| Mn | 16001 | 14699 | 14211 | 13900 | 13169 |
| T melting (Tm) ° C. | 258.4 | 257.5 | 257.9 | 257.1 | 257.7 |
| T crystallization (Tc) ° C. | 199.6 | 205.3 | 207.2 | 207.5 | 208.1 |
| Heat of cryst. (dHc) J/g | 44.5 | 49.4 | 51.0 | 53.9 | 53.1 |

The results for PBT examples that employed a glass fiber filler are summarized in Table 5. These blends were prepared by adding the fiber glass after an initial mixing period of approximately 4 minutes and then gently mixing the mixture on a drum tumbler to prevent fuzzing of the glass fiber bundles. Examples 14 to 17 and Control D show the utility of octadecyl amine modification of 30 weight percent glass fiber (GF) reinforced PBT. With only 0.3 to 1.0 weight percent octadecyl amine, melt flow at 250° C. was increased from 4.6 to as high as 50.4 cc/10 minute. The glass fiber and its chemical coating did not cause any interference in the reaction. Examples 14 to 17 all extruded well with no surging or foaming. The crystallization temperature (Tc) was increased as was the heat of crystallization (dHc). The change in melt viscosity on being held at 250° C. for 30 minutes was reduced with the added octadecyl amine compared to the 30 percent GF control (Control D) which contained no amine. This finding indicates superior melt stability of the glass-reinforced high flow amine-modified resins. The flexural modulus was also increased in some instances to over 8000 MPa.

TABLE 5

| Glass Filled High Mw PBT Examples | | | | | |
|---|---|---|---|---|---|
| Example | D [Control] | 14 | 15 | 16 | 17 |
| Weight Percent PBT 315 | 70.0% | 69.7% | 69.5% | 69.3% | 69.0% |
| Weight Percent Glass Fiber | 30.0% | 30.0% | 30.0% | 30.0% | 30.0% |
| Weight Percent $C_{18}H_{37}NH_2$ | 0.0% | 0.3% | 0.5% | 0.7% | 1.0% |
| Melt Flow 250° C., 2.16 Kg, cc/10 min | 4.6 | 9.4 | 18.0 | 25.3 | 50.4 |
| Mw (PS stds) | 102200 | 84036 | 73638 | 65754 | 56692 |
| Mn | 29633 | 25933 | 23606 | 21886 | 19820 |
| Melt Dwell 250° C. 6 min. (P) | 17992 | 9157 | 4577 | 3749 | 1722 |
| Melt Dwell 250° C. 30 min. (P) | 11621 | 6519 | 3716 | 2971 | 1628 |
| Percent change 6 to 30 min. | −34.5% | −28.8% | −18.8% | −20.7% | −5.5% |
| T melting (Tm) ° C. | 222.3 | 222.7 | 222.9 | 222.7 | 222.7 |
| T crystallization (Tc) ° C. | 189.3 | 191.6 | 192.4 | 192.9 | 194.0 |
| Heat of cryst. (dHc) J/g | 38.9 | 39.4 | 42.0 | 39.4 | 45.2 |
| Flex Modulus MPa | 7830 | 7880 | 8090 | 8350 | 8130 |
| Flex Strength MPa | 188 | 187 | 191 | 188 | 183 |

The foregoing invention has been described in some detail by way of illustration and example for purposes of clarity and understanding. The invention has been described with reference to various specific embodiments and techniques. However, it should be understood that many variations and modifications may be made while remaining within the spirit and scope of the invention. It will be obvious to one of skill in the art that changes and modifications may be practiced within the scope of the appended claims. Therefore, it is to be understood that the above description is intended to be illustrative and not restrictive. The scope of the invention should, therefore, be determined not with reference to the above description, but should instead be determined with reference to the following appended claims, along with the full scope of equivalents to which such claims are entitled. All patents, patent applications, and publications cited in this application are hereby incorporated by reference in their entirety for all purposes to the same extent as if each individual patent, patent application, or publication were so individually denoted.

What is claimed is:

1. A solvent-free process for preparing an amine-modified thermoplastic polyester resin of Formula 2:

Formula 2

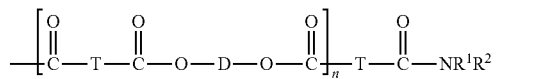

comprising:
mixing at a temperature in the range of 200° C. to 350° C. in a single screw or twin screw extruder with no external vacuum applied a melted polyester of Formula 1:

Formula 1

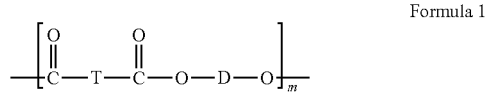

wherein:
each T is independently a divalent $C_{6-10}$ aromatic group derived from a dicarboxylic acid or a chemical equivalent thereof;
each D is independently a divalent $C_{2-8}$ alkylene group derived from a dihydroxy compound or a chemical equivalent thereof; and
m and n vary from 25 to 1000 and n is less than m;
and a melted amine, having the formula $NHR^1R^2$,
wherein:
$R^1$ is $C_{6-36}$ alkyl, $R^2$ is hydrogen, $C_1$-$C_{36}$ alkyl, $C_1$-$C_{36}$ alkylene-aryl, $C_1$-$C_{36}$ alkylene-heteroaryl, $C_1$-$C_{36}$ alkylene-cycloalkyl, or $C_1$-$C_{36}$ alkylene-heterocycloalkyl, and $NHR^1R^2$ contains at least 10 carbons;
thereby forming an amine-modified thermoplastic polyester resin characterized by one or both of the following properties:
(i) the resin comprises 0.01 to 5 weight percent of the amine; and
(ii) the ratio of the melt flow of the amine-modified resin of Formula 2 compared to the unmodified polyester of Formula 1, as measured according to ASTM D1238, is at least 1.05:1.

2. The process of claim 1, wherein:
each T in the resin of Formula 2 is independently phenyl or naphthyl; and
each D in the resin of Formula 2 is independently selected from the group consisting of ethylene, propylene, butylene, and dimethylenecyclohexene.

3. The process of claim 1, wherein the polyester of Formula 1 is selected from the group consisting of poly(ethylene terephthalate), poly(1,4-butylene terephthalate), poly(ethylene naphthalate), poly(butylene naphthalate), poly(1,3-propylene terephthalate), poly(cyclohexylenedimethylene terephthalate) and combinations thereof.

4. The process of claim 1, wherein the polyester of Formula 1 is a post-consumer recycled polyester.

5. The process of claim 1, wherein the polyester of Formula 1 further comprises 10 to 500 ppm of one or more metal cations selected from the group consisting of at least one of Ti, Sb, Sn, Zn, Ge, Zr, and Co.

6. The process of claim 1, wherein the polyester resin of Formula 2 is characterized by a —COOH end group content of 10 meq/kg or less.

7. The process of claim 1, wherein the amine has a boiling point that is 200° C. or higher at ambient pressure and a carbon to nitrogen ratio of 10:1 to 36:1.

8. The process of claim 1, wherein the resin of Formula 2 comprises 0.05 to 2.5 weight percent of the reacted amine.

9. The process of claim 1, wherein the resin further comprises 1 to 60 weight percent of a filler selected from the group consisting of fiber glass, carbon fibers, ceramic fibers, talc, clay, mica, wollastonite, silica, quartz, alumina, barium sulfate, carbon, graphite, metal oxides, glass beads, glass flakes, milled glass, and any combination thereof.

10. The process of claim 1, comprising 10 to 40 weight percent fiber glass with a diameter of 9 to 20 microns.

11. The process of claim 1, wherein 500 ppm or less of an organic solvent is present.

12. The process of claim 1, wherein the process is a continuous process.

13. The process of claim 1, wherein the resin of Formula 2 has a temperature of crystallization higher than the temperature of crystallization of polyester of Formula 1.

14. The process of claim 1, the ratio of the melt flow of the resin of Formula 2 compared to the unmodified polyester of Formula 1, as measured according to ASTM D1238, is at least 1.1:1.

15. The process of claim 1, wherein the resin of Formula 2 has a melt viscosity at 250° C. of 20 to 100 cc/10 minute.

16. The process of claim 1, wherein 50 percent or more of the ester linkages in Formula 1 are terephthalate linkages.

17. The process of claim 1, wherein the resin of Formula 2 is essentially free of metal cations or metal oxides selected from the group consisting of Pb, Hg, As, and Cd.

* * * * *